(12) United States Patent
Yamato

(10) Patent No.: US 6,449,528 B1
(45) Date of Patent: Sep. 10, 2002

(54) NC MACHINE TOOL

(75) Inventor: Kuniharu Yamato, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 0 days.

(21) Appl. No.: 09/359,749

(22) Filed: Jul. 23, 1999

(30) Foreign Application Priority Data

Jul. 27, 1998 (JP) .......................................... 10-210522

(51) Int. Cl.[7] .......................... G06F 19/00; G05B 11/01; G05B 15/00
(52) U.S. Cl. .......................... 700/180; 700/17; 700/83; 700/264
(58) Field of Search .......................... 700/17, 83, 180, 700/264, 184, 185, 192

(56) References Cited

U.S. PATENT DOCUMENTS

| | | | | |
|---|---|---|---|---|
| 4,648,028 A | * | 3/1987 | DeKlotz et al. | ............... 700/83 |
| 4,918,612 A | * | 4/1990 | Handte | ....................... 700/180 |
| 5,061,887 A | * | 10/1991 | Miyata et al. | ......... 318/568.25 |
| 6,052,108 A | * | 4/2000 | Gadd | .......................... 345/749 |
| 6,055,461 A | * | 4/2000 | Sumiyama et al. | ......... 700/175 |

FOREIGN PATENT DOCUMENTS

JP         10-161717         6/1998

* cited by examiner

*Primary Examiner*—Leo Picard
*Assistant Examiner*—Elliot Frank
(74) *Attorney, Agent, or Firm*—Armstrong, Westerman & Hattori, LLP

(57) ABSTRACT

An NC machine tool is provided which includes a movable unit (11), drive device (12) for moving the movable unit along axes, manual operation device (23) for driving the drive device by manual operation, axis selection device (22) for selecting one of the plurality of axes to be operated by the manual operation means, positional coordinate calculating device (34) for calculating positional coordinates of the movable unit, display device (25) for displaying the positional coordinates of the movable unit, and display control means (39) for controlling the display means to display the positional coordinates on the display device. In a manual operation mode, the display control device controls the display device to display a positional coordinate of the movable unit with respect to the selected axis in a form different from a display form of the other axes on the display device.

4 Claims, 5 Drawing Sheets

NC MACHINE TOOL

BACKGROUND OF THE INVENTION

1. Field of the Invention

The present invention relates to an NC (numerically controlled) machine tool which comprises a plurality of axes for movement for moving a movable unit, and display means for displaying positional coordinates of the movable unit with respect to the plurality of axes.

2. Description of the Prior Art

One exemplary NC machine tool of the aforesaid type is shown in FIG. 6, which is a block diagram schematically illustrating the construction of the NC machine tool.

As shown, the NC machine tool 50 includes a machine tool 10, an NC (numerical controller) 30 and a PLC (programmable controller) 40 for controlling operating portions of the machine tool 10, and an operation panel 20 for operating the respective operating portions of the machine tool 10 via the NC 30 and the PLC 40. In general, the NC 30 and the PLC 40 constitute a numerical control apparatus.

The machine tool 10 includes a movable unit 11 such as a carriage, and a plurality of drive mechanisms 12 each adapted to move the movable unit 11 along an axis for movement. In general, there are provided a plurality of axes for movement, for example, X-axis, Z-axis and C-axis, and the drive mechanisms 12 are respectively provided in association with the axes so that the movable unit 11 can bemoved along the respective axes.

More specifically, the drive mechanisms 12 each include a servo motor 13 for driving the movable unit 11, a servo amplifier 14 for controlling the operation of the servo motor 13, and an position detector (encoder) 16 for sensing an angular position of the servo motor 13. The drive mechanism 12 and a controller 31 to be described later constitute a so-called semi-closed loop servo mechanism, so that a position detection signal detected by the position detector 16 is fed back to the controller 31.

The operation panel 20 includes: a mode selection switch 21 which permits an operator to select a desired control mode of the drive mechanisms 12; an axis selection switch 22 which permits the operator to select one of the plurality of axes along which the movable unit 11 is to be moved by manual operation; a pulse handle 23 to be manually operated to move the movable unit 11; a multiplication factor selection switch 24 which permits the operator to select a desired one of predetermined multiplication factors of a movement amount of the movable unit 11 for each pulse outputted from the pulse handle 23; and a CRT display (hereinafter referred to simply as "CRT") 25 for displaying positional coordinates of the movable unit 11 and the like.

The mode selection switch 21 includes a plurality of key switches for automatic operation modes such as a memory operation mode and a programmable tape operation mode and manual operation modes such as a jogging mode and a handle feed mode. When one of the key switches for a desired mode is pressed, a selection signal is inputted from the key switch to the PLC 40 to allow for an operation in the desired mode. Where the movable unit 11 is to be operated with the use of the pulse handle 23, the handle feed mode is selected.

The axis selection switch 22 includes a plurality of key switches for the respective axes, e.g., X-axis, Z-axis and C-axis. When the handle feed mode is selected by the mode selection switch 21, a desired one of the axes is selected by pressing the corresponding key switch of the axis selection switch 22, whereby a selection signal is outputted from the key switch to the PLC 40. This permits the movable unit 11 to be moved along the selected axis.

When the pulse handle 23 is rotated, a pulse signal is generated in accordance with the amount of the rotation thereof. More specifically, the pulse handle 23 is manually rotated, whereby a pulse signal of a predetermined pulse number is generated in accordance with an angular movement amount of the pulse handle 23 and then inputted to the NC 30.

The multiplication factor selection switch 24 includes a plurality of key switches, for example, for multiplication factors of ×1, ×10 and ×100. When one of the key switches for a desired multiplication factor is pressed, a selection signal is inputted from the key switch to the PLC 40.

The PLC 40 controls: fundamental functional operations for the machine tool such as various interlock operations and operations of a spindle, a magazine, an automatic tool changer (ATC), an automatic pallet changer (APC) and a tool post; and auxiliary functional operations for the machine tool such as operations of jigs to be incorporated in the machine tool in accordance with a workpiece and a working process, a cutting oil feeder, a chip remover and a workpiece loader/unloader. The PLC 40 receives the signals from the mode selection switch 21, the axis selection switch 22 and the multiplication factor selection switch 24. Where the selection signal inputted from the mode selection switch 21 indicates the selection of the handle feed mode, the PLC 40 outputs the axis selection signal and the multiplication factor selection signal from the axis selection switch 22 and the multiplication factor selection switch 24, respectively, to the NC 30.

The NC 30 numerically controls the respective drive mechanisms 12 on the basis of a machining program, MDI data, a manual rapid feeding signal, a manual operation pulse signal and the like. The NC 30 comprises: the aforesaid controllers 31 respectively associated with the drive mechanisms 12; distribution means 32 which generates a pulse signal (movement command signal) by multiplying the pulse number of the pulse signal directly inputted from the pulse handle 23 by the selected multiplication factor specified by the multiplication factor selection signal inputted from the multiplication factor selection switch 24 via the PLC 40, and outputs the generated pulse signal to one of the controllers 31 specified by the selection signal inputted from the axis selection switch 22 via the PLC 40 and to positional coordinate calculating means 34 to be described later; the positional coordinate calculating means 34 for calculating positional coordinates of the movable unit 11 in a machine coordinate system and/or a work coordinate system on the basis of the pulse signal (movement command signal) inputted from the distribution means 32; and display control means 33 for outputting the calculated positional coordinate data together with display format data to the CRT 25 and displaying the positional coordinate data on the CRT 25.

When the movable unit 11 is to be moved by manual operation with the use of the pulse handle 23 in the NC machine tool 50 of the aforesaid construction, the handle feed mode is selected by pressing the corresponding key switch of the mode selection switch 21, and one of the axes and one of the multiplication factors which are to be employed for the movement of the movable unit 11 are respectively selected by pressing the corresponding key switches of the axis selection switch 22 and the multiplication factor selection switch 24. Thus, signals are respectively inputted from the mode selection switch 21, the axis selection switch 22 and the multiplication factor selection switch 24 to the PLC 40, and an axis selection signal and a multiplication factor selection signal are inputted from the PLC 40 to the distribution means 32 of the NC 30.

When the pulse handle 23 is rotated, a pulse signal is generated by the pulse handle 23 in accordance with the angular movement amount thereof, and inputted to the distribution means 32. By multiplying the pulse number of the inputted pulse signal by the selected multiplication factor, a pulse signal (movement command signal) is generated, which is in turn inputted from the distribution means 32 to one of the controllers 31 specified by the axis selection signal. Thus, the corresponding drive mechanism 12 is controlled by the controller 31 to move the movable unit 11 by a distance according to the inputted pulse signal.

The pulse signal (movement command signal) from the distribution means 32 is also inputted to the positional coordinate calculating means 34. On the basis of the pulse signal (movement command signal), the positional coordinate calculating means 34 calculates positional coordinates of a target location to which the movable unit 11 is to be moved. The positional coordinate data are outputted to the display control means 33, which in turn displays the positional coordinate data in a predetermined format on the CRT 25.

One exemplary display image thus displayed on the CRT 25 is shown in FIG. 7. As shown, positional coordinates of the movable unit 11 are listed along with the designations of the axes.

With the NC machine tool 50, an operator can move the movable unit 11 to the exact target location by operating the pulse handle 23 while viewing the display image on the CRT 25 to accurately keep up with the current position of the movable unit 11.

However, the aforesaid conventional NC machine tool 50 suffers from the following drawbacks.

When the movable unit 11 is moved by the manual operation, the operator performs the moving operation while visually checking the actual position of the movable unit 11. Therefore, the operator often takes his eyes off the CRT 25. In the conventional case where the positional coordinates of the movable unit 11 are listed for the respective axes on the CRT 25, however, it is difficult for the operator to instantaneously pick up data concerning the axis of interest from the listed positional coordinate data when he views the display image on the CRT 25 to check the current position of the movable unit 11. This makes a series of moving operations troublesome, prolonging the time required for the moving operations.

For improvement of the efficiency of the moving operation of the movable unit 11, an operator familiar with the operation of the operation panel 20 sometimes blindly operates the axis selection switch 22 and the pulse handle 23 while mainly checking the movable unit 11 and the CRT 25. In this case, however, the operator often erroneously operates the axis selection switch 22 to select an unintended axis, whereby the movable unit 11 is inadvertently moved along the unintended axis. This results in a reduction in the efficiency of the moving operation.

In view of the foregoing, it is an object of the present invention to provide an NC machine tool which allows for easy check of positional coordinate data of a movable unit on a selected axis on a display in a manual operation mode.

SUMMARY OF THE INVENTION

In accordance with the present invention, there is provided an NC machine tool which comprises: at least one movable unit; drive means having a plurality of axes for movement and operative to move the movable unit along the axes; manual operation means for driving the drive means by manual operation; axis selection means for selecting one of the plurality of axes along which the movable unit is to be moved by the manual operation means; positional coordinate calculating means for calculating positional coordinates of the movable unit with respect to the plurality of axes on the basis of a movement command; display means capable of displaying the positional coordinates of the movable unit with respect to the plurality of axes at least in a list form; and display control means for controlling the display means to display the positional coordinates at least in the list form on the display means, wherein the display control means receives a selection signal indicative of the selected axis from the axis selection means in a manual operation mode, and controls the display means to display a positional coordinate of the movable unit with respect to the selected axis in a display form different from a display form of the positional coordinates of the movable unit with respect to the other axes on the display means, whereby the positional coordinate of the movable unit with respect to the selected axis is distinguishable from the positional coordinates with respect to the other axes on the display means.

With this arrangement, the positional coordinates of the movable unit with respect to the plurality of axes are calculated on the basis of the movement command, and the calculated positional coordinates are displayed in the list form on the display means. When the movable unit is moved by the manual operation, the coordinate of the movable unit with respect to the axis selected by the axis selection means is displayed on the display means in the display form different from the display form of the positional coordinates of the movable unit with respect to the other axes.

Thus, the operator can easily recognize the coordinate of the movable unit with respect to the selected axis in distinction from the positional coordinates of the movable unit with respect to the other axes to smoothly and readily perform the moving operation. Even if the operator inadvertently selects an unintended axis, he can instantaneously recognize the selection of the unintended axis, thereby preventing such an inconvenience that the movable unit is moved along the unintended axis. Thus, the reduction in the efficiency of the moving operation can be prevented which may otherwise occur due to selection of the unintended axis.

The display control means may be adapted to control the display means to display a list of the positional coordinates of the movable unit with respect to the plurality of axes and, at the same time, display the positional coordinate of the movable unit with respect to the selected axis separately from the list of the positional coordinates on the display means in the manual operation mode. With this arrangement, the positional coordinate of the movable unit with respect to the axis selected by the axis selection means is displayed on the display means separately from the positional coordinates of the movable unit with respect to the other axes. Therefore, the operator can easily recognize the positional coordinate of the movable unit with respect to the selected axis in distinction from the positional coordinates of the movable unit with respect to the other axes.

The display control means may be adapted to control the display means to display the positional coordinate with respect to the selected axis on a greater scale separately from the list of the positional coordinates with respect to the plurality of axes on the display means in the manual operation mode. With this arrangement, the positional coordinate with respect to the axis selected by the axis selection means is displayed on a greater scale on the display means separately from the positional coordinates with respect to the other axes. Therefore, the operator can more easily recognize the coordinate of the movable unit with respect to the selected axis in distinction from the positional coordinates with respect to the other axes.

The display control means may be adapted to control the display means to display a list of the positional coordinates with respect to the plurality of axes on the display means and, in the manual operation mode, display only the positional coordinate with respect to the selected axis on the display means instead of the list of the positional coordinates with respect to the plurality of axes in response to the reception of the selection signal from the axis selection means. With this arrangement, only the positional coordinate with respect to the axis selected by the axis selection means is displayed on the display means, so that the operator can further more easily and accurately recognize the positional coordinate with respect to the selected axis. Thus, the moving operation can be performed more efficiently.

The manual operation means includes multiplication factor selection means for selectively changing a multiplication factor which defines the ratio of a movement amount of the movable unit to a manual operation amount, and the display control means is adapted to receive a selection signal indicative of the selected multiplication factor from the multiplication factor selection means and control the display means to display the positional coordinates of the movable unit together with the selected multiplication factor on the display means. With this arrangement, the selected multiplication factor is displayed together with the positional coordinate with respect to the selected axis on the display means, so that the operator can easily and accurately estimate the movement amount of the movable unit to be moved by the manual operation. Thus, the operator can properly and accurately perform the manual operation.

DETAILED DESCRIPTION OF THE PREFERRED EMBODIMENT

Figure 1:
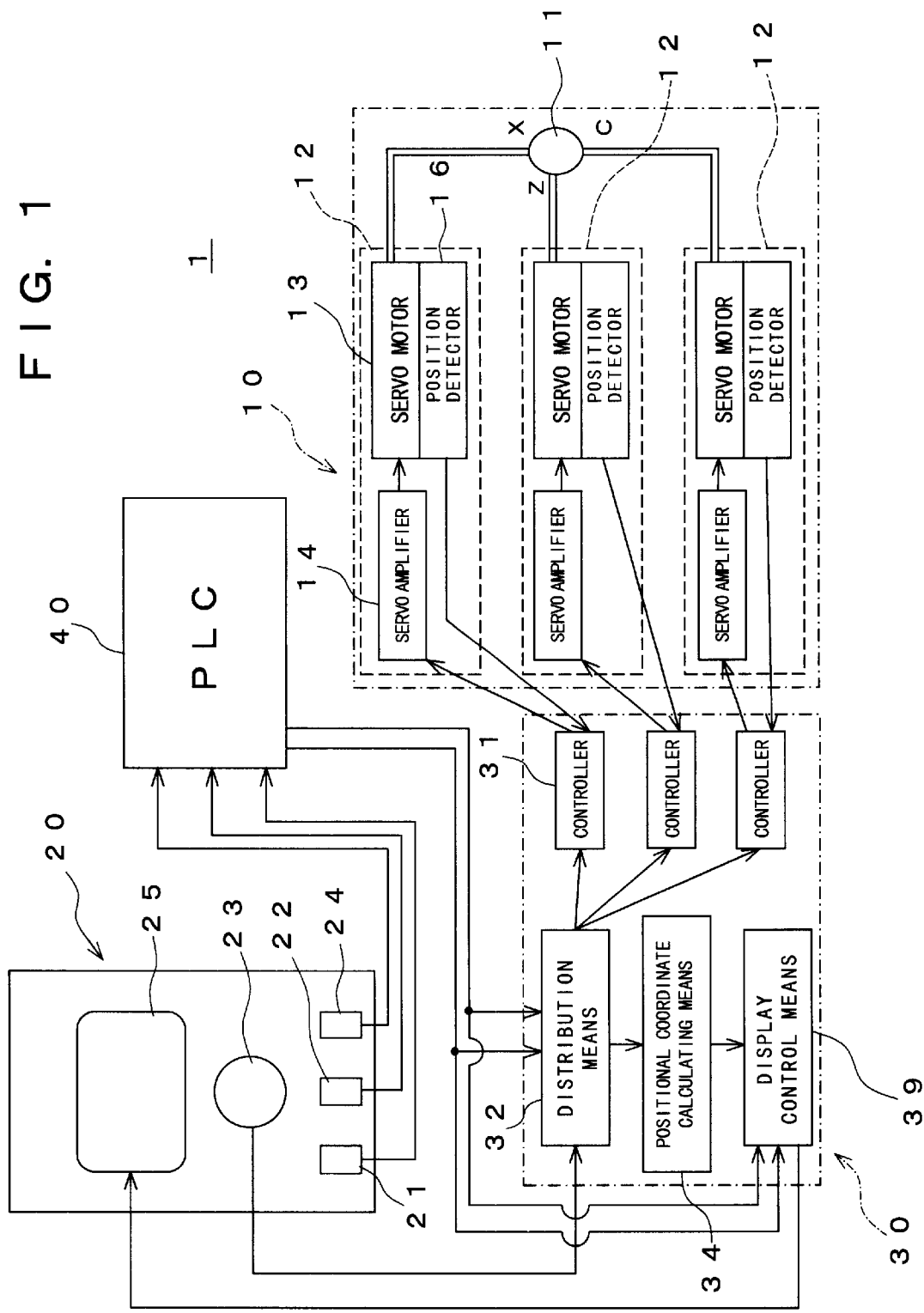
FIG. 1 is a block diagram schematically illustrating an NC machine tool in accordance with one embodiment of the present invention.

One embodiment of the present invention will hereinafter be described in detail with reference to the attached drawings. FIG. 1 is a block diagram schematically illustrating the construction of an NC machine tool 1 according to the present invention. As shown, the NC machine tool 1 according to this embodiment has substantially the same construction as the aforesaid conventional NC machine tool 50, except that display control means 39 employing a display format different from the conventional one is provided instead of the display control means 33 of the NC machine tool 50, and that the axis selection signal and the multiplication factor selection signal outputted from the PLC 40 are inputted to the display control means 39 as well as the distribution means 32. Therefore, the same components as employed in the NC machine tool 50 are denoted by the same reference numerals, and no explanation will be given thereto.

The display control means 39 employs a display format which includes a list display region 26 in which positional coordinates of the movable unit 11 with respect to the plurality of axes for movement (e.g., X-axis, Z-axis and C-axis) are displayed together with the designations of the axes in a list form, an enlarged display region 27 in which the designation of one of the axes selected by the axis selection switch 22 and a positional coordinate of the movable unit 11 with respect to the selected axis are displayed outside the list display region 26, and a multiplication factor display region 28 in which one of the multiplication factors selected by the multiplication factor selection switch 24 is displayed.

In the NC machine tool 1 having the display control means 39 according to this embodiment, the display control means 39 outputs positional coordinate data inputted from the positional coordinates calculating means 34 together with the display format data to the CRT 25, and displays the positional coordinate data in the list display region 26 on the CRT 25.

When the handle feed mode is selected by the mode selection switch 21 and one of the predetermined multiplication factors is selected by the multiplication factor selection switch 24, the handle feed mode selection data and the multiplication factor data are inputted to the display control means 39 via the PLC 40. In response thereto, the display control means 39 outputs the positional coordinate data, the inputted axis selection data and multiplication factor data and the display format data to the CRT 25. Then, the display control means 39 displays the positional coordinate data in the list display region 26, the axis selection data and the positional coordinate data on the selected axis in the enlarged display region 27, and the multiplication factor data in the multiplication factor display region 28 on the CRT 25.

Figure 2:
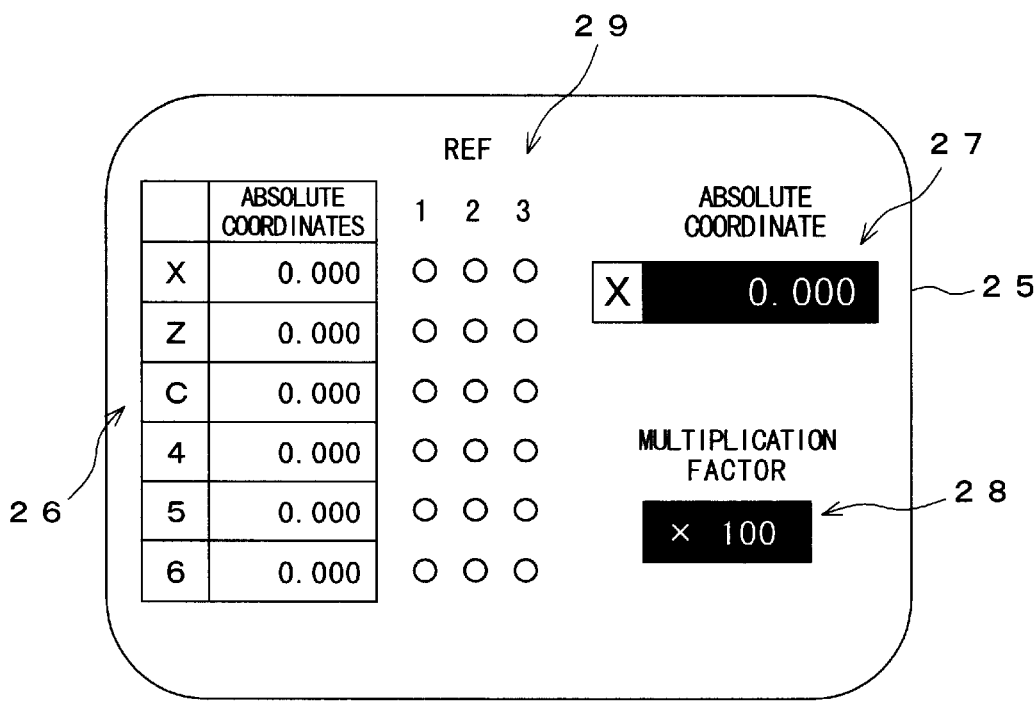
FIG. 2 is an explanatory diagram illustrating a display image to be displayed on a CRT in accordance with the embodiment.

A display image thus displayed on the CRT 25 is shown in FIG. 2. Areas for axes 4, 5 and 6 in the list display region 26 are spare areas. In FIG. 2, a reference numeral 29 denotes a reference point display region, in which reference points corresponding to origins on the respective axes (three points in this embodiment) are displayed and, when the movable unit 11 is located on an origin, a corresponding reference point is highlighted.

Since the positional coordinate data on the selected axis is displayed on a greater scale separately from the positional coordinate data on the respective axes in the NC machine tool 1 according to this embodiment, the operator can easily recognize the positional coordinate data of the movable unit 11 on the selected axis in distinction from the positional coordinate data on the other axes and, therefore, readily and smoothly perform the moving operation.

Even if the operator inadvertently selects an unintended axis, he can instantaneously recognize the selection of the unintended axis to eliminate such an inconvenience that the movable unit is moved along the unintended axis. Thus, the reduction in the efficiency of the moving operation can be prevented which may otherwise occur due to the selection of the unintended axis.

Figure 3:
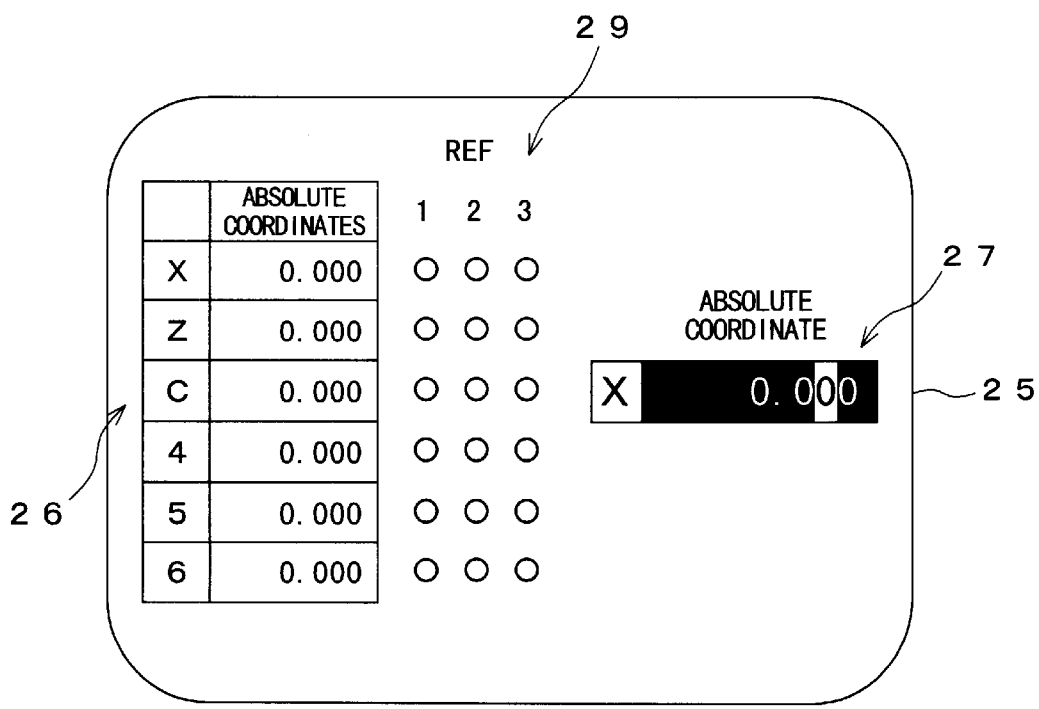
FIG. 3 is an explanatory diagram illustrating another display image to be displayed on the CRT in accordance with the embodiment.

While one embodiment of the present invention has thus been described, it should be understood that the invention is not limited to this specific embodiment. Although the multiplication factor data is displayed in the multiplication factor display region 28 specially provided, the way of displaying the multiplication factor data is not limited thereto. For example, the multiplication factor data may be expressed in such a manner that the positional coordinate data on the selected axis displayed in the enlarged display region 27 has a reversely highlighted portion on a digit place thereof corresponding to the selected multiplication factor, as shown in FIG. 3. Alternatively, only the corresponding digit place may be shown in a different color, underlined, marked, or blinked. With this arrangement, the operator can easily recognize the selected multiplication factor.

In the aforesaid embodiment, the positional coordinate data on the selected axis is displayed on a greater scale in the region provided separately from the list display region in which the positional coordinate data on the respective axes are displayed. However, the enlarged display is not necessarily required as long as the operator can easily recognize the positional coordinate data on the selected axis displayed in the separate region.

Figure 4:
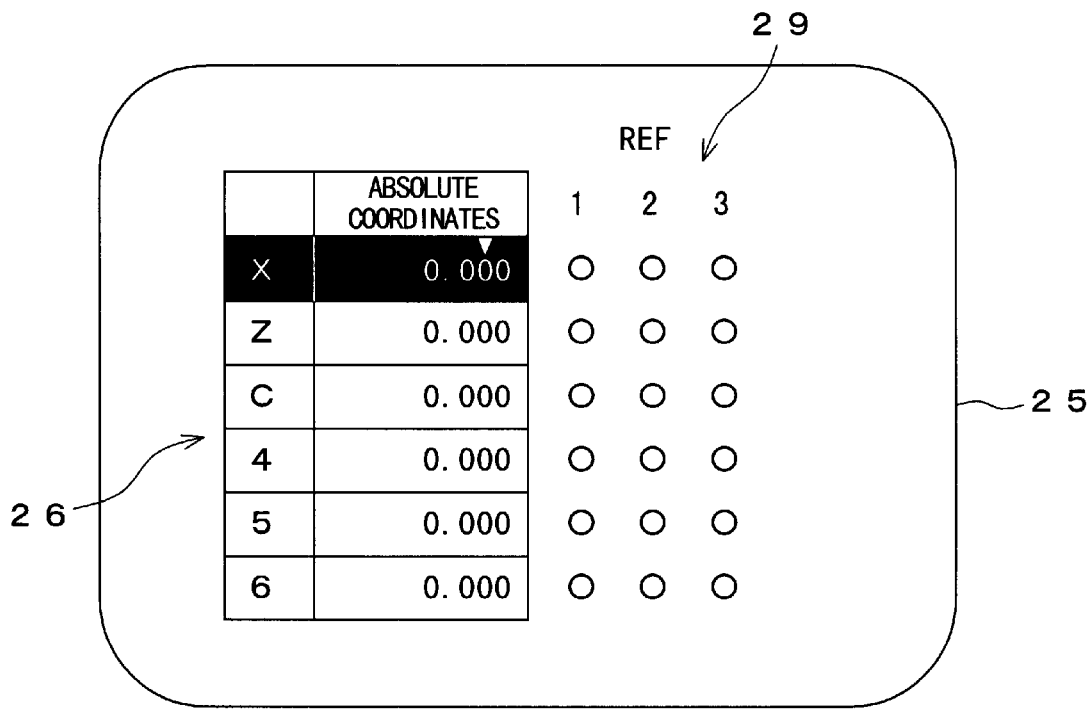
FIG. 4 is an explanatory diagram illustrating another display image to be displayed on the CRT in accordance with the embodiment.

Further, the positional coordinate data on the selected axis may be displayed in a different display form, e.g., reversely highlighted or displayed in a different color as shown in FIG. 4, in the list display region 26 so as to be distinguished from the positional coordinate data on the other axes, although the positional coordinate data on the selected axis is displayed in the region separate from the list display region in the aforesaid embodiment. In this case, the digit place of the positional coordinate data corresponding to the multiplication factor may be marked as shown in FIG. 4, so that the operator can recognize the positional coordinate data on the selected axis as well as the multiplication factor data at a glance.

Figure 5:
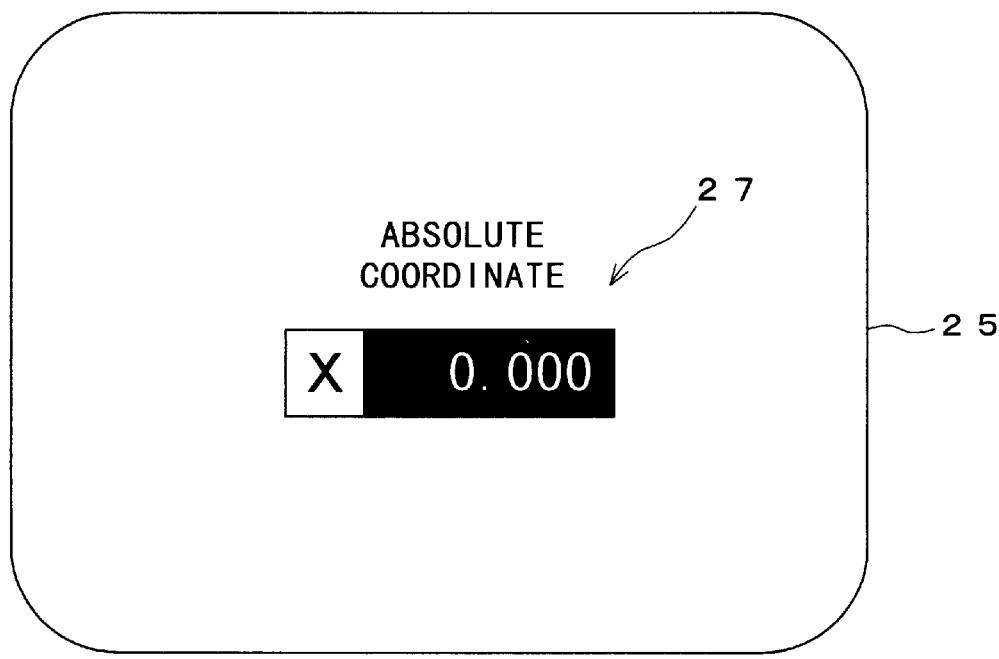
FIG. 5 is an explanatory diagram illustrating further another display image to be displayed on the CRT in accordance with the embodiment.
Figure 6:
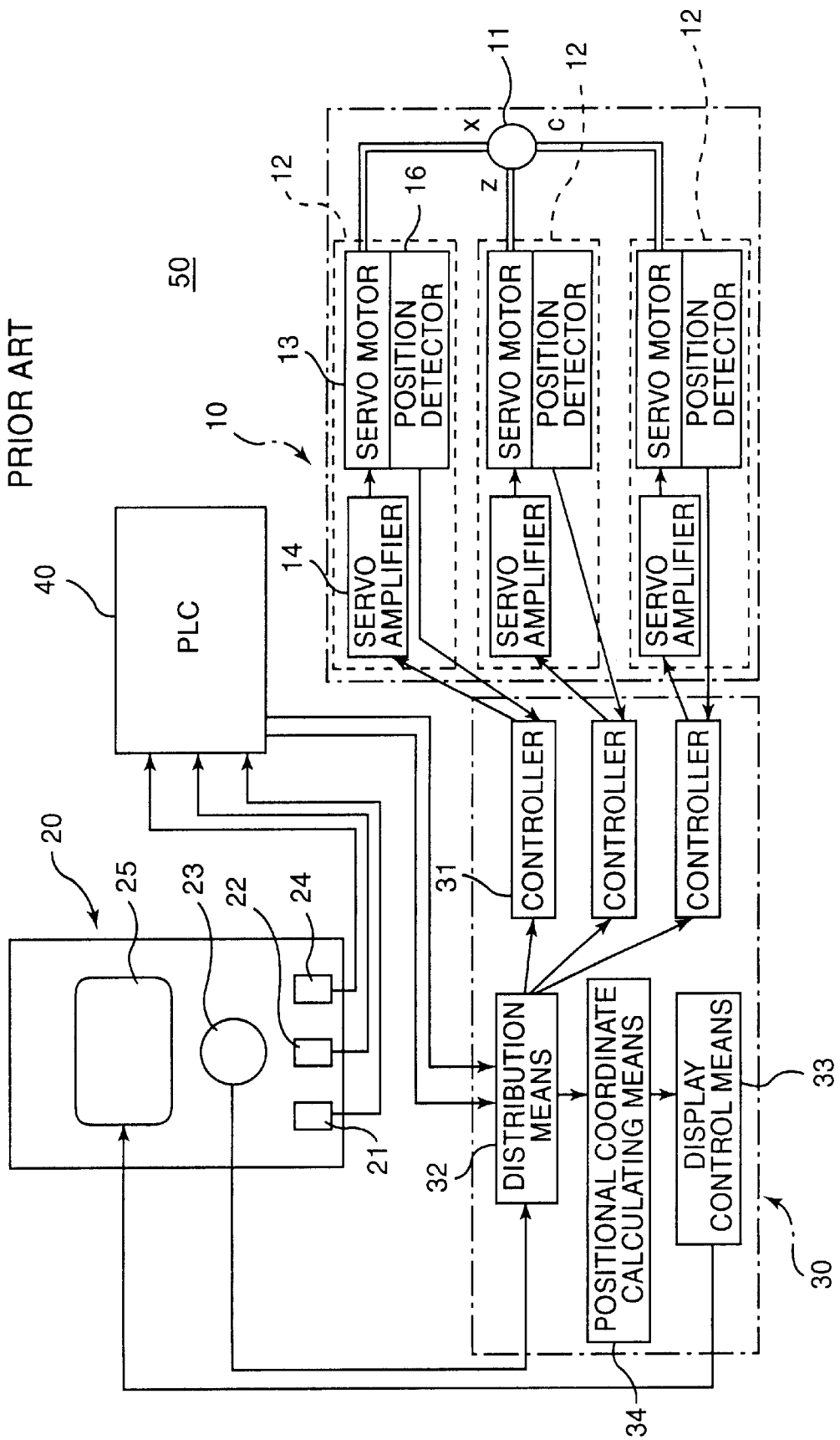
FIG. 6 is a block diagram schematically illustrating the construction of a conventional NC machine tool.
Figure 7:
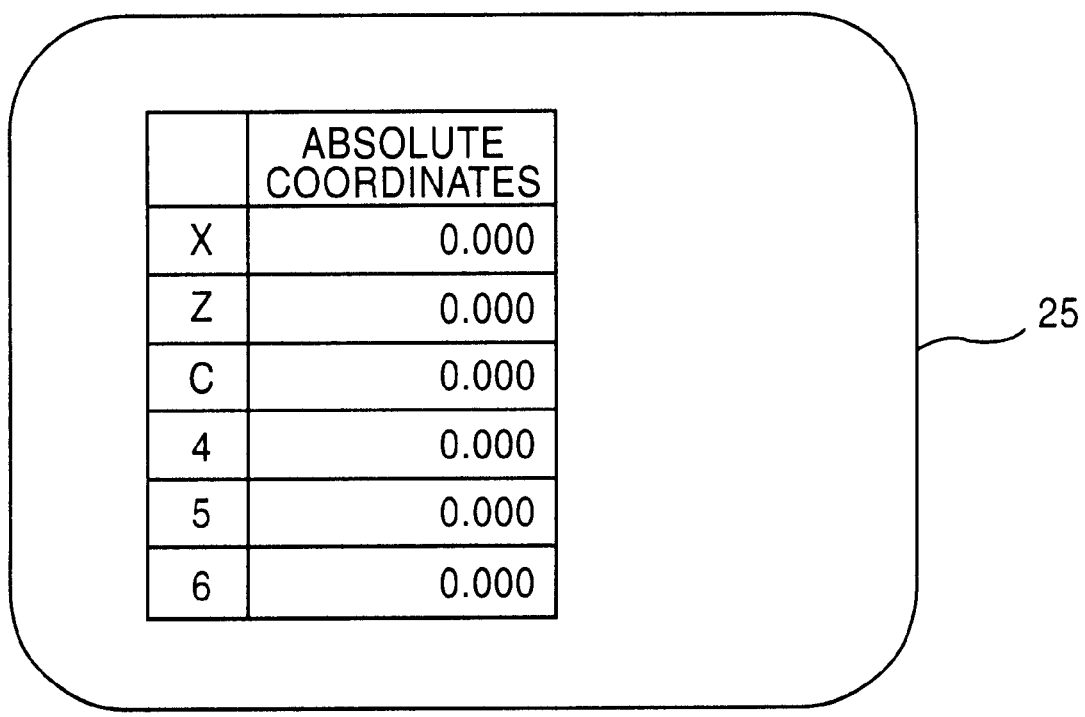
FIG. 7 is an explanatory diagram illustrating a display image to be displayed on a CRT of the conventional NC machine tool.

The display control means 39 may be adapted to control the CRT 25, when the selection signal indicative of the axis selected by the axis selection switch 22 is inputted to the display control means 39 in the manual operation mode, as shown in FIG. 5 to display only the positional coordinate data on the selected axis instead of the list of the positional coordinate data on the respective axes as shown in FIG. 7. With this arrangement, the operator can more easily and accurately recognize the positional coordinate data on the selected axis to perform the moving operation of the movable unit 11 more efficiently.

What is claimed is:

1. An NC machine tool comprising:
   at least one movable unit;
   drive means having a plurality of axes for movement and operative to move the movable unit along the axes;
   manual operation means for driving the drive means by manual operation;
   axis selection means for selecting one of the plurality of axes along which the movable unit is to be moved by the manual operation means and generating a selection signal indicative of the selected axis;
   positional coordinate calculating means for calculating positional coordinates of the movable unit with respect to the plurality of axes on the basis of a movement command;
   display means capable of displaying the positional coordinates of the movable unit with respect to the plurality of axes at least in a list form; and
   display control means for controlling the display means to display the positional coordinates at least in the list form on the display means;
   wherein the display control means controls the display means to display the positional coordinate of the movable unit with respect to the selected axis separately from the list of the positional coordinates on the display means when receiving the selection signal indicative of the selected axis from the axis selection means in a manual operation mode, the positional coordinate of the movable unit with respect to the selected axis being one of the positional coordinate contained in the list.

2. An NC machine tool as set forth in claim 1, wherein the display control means controls the display means to display the positional coordinate with respect to the selected axis on a greater scale separately from the list of the positional coordinates with respect to the plurality of axes on the display means when receiving the selection signal indicative of the selected axis from the axis selection means in the manual operation mode.

3. An NC machine tool comprising:
   at least one movable unit:
   drive means having a plurality of axes for movement and operative to move the movable unit along the axes:
   manual operation means for driving the drive means by manual operation;
   axis selection means for selecting one of the plurality of axes along which the movable unit is to be moved by the manual operation means and generating a selection signal indicative of the selected axis;
   positional coordinate calculating means for calculating positional coordinates of the movable unit with respect to the plurality of axes on the basis of a movement command;
   display means capable of displaying the positional coordinates of the movable unit with respect to the plurality of axes at least in a list form; and
   display control means for controlling the display means to display the positional coordinates at least in the list form on the display means;
   wherein the display control means controls the display means to display only the positional coordinate with respect to the selected axis on the display means instead of the list of the positional coordinates with respect to the plurality of axes when receiving the selection signal indicative of the selected axis from the axis selection means in the manual operation mode.

4. An NC machine tool as set forth in any of claims 1, 2, and 3,
   wherein the manual operation means comprises multiplication factor selection means for selectively changing a multiplication factor which defines a ratio of an actual movement amount of the movable unit to a command movement amount inputted by a manual operation and generating a selection signal indicative of selected multiplication factor,
   wherein the display control means controls the display means to display the positional coordinates of the movable unit together with the selected multiplication factor on the display means when receiving the selection signal indicative of the selected multiplication factor from the multiplication factor selection means.

* * * * *